(12) United States Patent
Yamada

(10) Patent No.: US 6,227,995 B1
(45) Date of Patent: May 8, 2001

(54) DRIVE SYSTEM FOR VEHICLE

(75) Inventor: Kenichi Yamada, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/433,693

(22) Filed: Nov. 3, 1999

(30) Foreign Application Priority Data

Nov. 5, 1998 (JP) .................................. 10-314731

(51) Int. Cl.$^7$ ............................. F16H 37/02; F16H 37/08
(52) U.S. Cl. .......................................... 475/210; 475/200
(58) Field of Search ................................. 475/200, 204, 475/210, 207, 219; 180/352, 374, 375, 378, 379

(56) References Cited

U.S. PATENT DOCUMENTS

| | | | |
|---|---|---|---|
| 2,960,888 | * | 11/1960 | Flinn ........................................ 475/71 |
| 4,502,352 | * | 3/1985 | Svab ...................................... 475/210 |
| 4,528,870 | * | 7/1985 | Van Deursen et al. .......... 475/200 X |
| 4,599,916 | * | 7/1986 | Hirosawa .............................. 475/210 |
| 5,470,285 | * | 11/1995 | Schneider et al. .................... 475/210 |
| 5,890,987 | * | 4/1999 | Lamers ................................. 475/210 |
| 6,026,921 | * | 2/2000 | Aoyama et al. ..................... 180/65.2 |

FOREIGN PATENT DOCUMENTS

| | | | |
|---|---|---|---|
| 2092246 | * | 8/1982 | (GB) ................................... 475/210 |
| 60-98261 | * | 6/1985 | (JP) .................................... 475/210 |
| 9267652 | | 10/1997 | (JP) . |
| 9277842 | | 10/1997 | (JP) . |

* cited by examiner

Primary Examiner—Charles A Marmor
Assistant Examiner—Roger Pang
(74) Attorney, Agent, or Firm—Martin A. Faber

(57) ABSTRACT

A drive system of a vehicle includes an engine mounted in a longitudinal direction of the vehicle, a starting device connected to the engine, a continuously variable transmission comprising a primary pulley, a secondary pulley and a drive belt looped over the primary pulley and secondary pulley and a forward and reverse changeover apparatus. The drive system further includes an input shaft extending in a longitudinal direction of the vehicle and connecting the starting device with the forward and reverse changeover apparatus, a primary shaft of the primary pulley arranged in parallel with the input shaft on one lateral side of the input shaft, a secondary shaft of the secondary pulley arranged in parallel with the input shaft on the other lateral side of the input shaft, and a hollow drive shaft rotatably fitted over the input shaft for transmitting output of the forward and reverse changeover apparatus to the primary shaft. The input shaft penetrates a space surrounded by the drive belt looped over both pulleys.

8 Claims, 4 Drawing Sheets

11: CRANK SHAFT
12: TORQUE CONVERTER
13: FORWARD AND REVERSE CHANGEOVER APPARATUS
14: INPUT SHAFT
15: PRIMARY SHAFT
16: PRIMARY PULLEY
17: SECONDARY SHAFT
18: SECONDARY PULLEY
25: HOLLOW DRIVE SHAFT

11: CRANK SHAFT
12: TORQUE CONVERTER
13: FORWARD AND REVERSE CHANGEOVER APPARATUS
14: INPUT SHAFT
15: PRIMARY SHAFT
16: PRIMARY PULLEY
17: SECONDARY SHAFT
18: SECONDARY PULLEY
25: HOLLOW DRIVE SHAFT

DRIVE SYSTEM FOR VEHICLE

BACKGROUND OF THE INVENTION

1. Field of the Invention

The present invention relates to a drive system for a vehicle, more particularly, to a drive system capable of transmitting driving force of a longitudinally mounted engine through a continuously variable transmission to drive wheels of the vehicle.

2. Prior Art

A belt driven continuously variable transmission has a primary pulley mounted on a primary shaft, a secondary pulley mounted on a secondary shaft provided in parallel with the primary shaft and a belt looped over the primary and secondary pulleys. Generally, the pulley diameter of the primary and secondary pulleys is determined based on miscellaneous design requirements such as pulley strength, belt strength, speed ratio and others. As a result, the pulleys need some amount of diameter and therefore a large distance is needed between the primary and secondary shafts. In case of a transversely mounted engine, that is, an engine whose crank shaft is arranged in the widthwise direction of the vehicle, such distance is not so big problem because the transversely mounted engine provides a relatively large longitudinal space in an engine room.

On the other hand, in a longitudinally mounted engine, an engine whose crank shaft is arranged in the longitudinal direction of the vehicle, since the primary shaft of the continuously variable transmission is connected with the crank shaft through a starting apparatus such as torque converter, electromagnetic clutch and the like, the secondary shaft must be arranged under the primary shaft. This arrangement requires a large vertical size to the transmission and also increases agitation loss of lubrication oil.

Further, in case of a vehicle such as front wheel drive vehicle or four wheel drive vehicle, a front differential must be incorporated in the engine room. In this case, a problem is that the total vertical length of the continuously variable transmission including the front differential extends further downwardly. In order to reduce the vertical length of the transmission, it is considered that the differential is arranged in an offsetting manner from the center of the vehicle to a left or right side. The problem of this arrangement is an unbalance in weight due to the left and right drive axles with unequal length.

In general, in case where an engine is longitudinally mounted, the longitudinal length of the engine room tends to become large. It is desirable to reduce the longitudinal size of the drive system in order to secure a large space of the passenger compartment. Particularly, it is desirable to design so as not to make a protrusion of a toe board into the passenger compartment.

Japanese Patent Applications Laid-open No. Toku-Kai-Hei 9-267652 and No. Toku-Kai-Hei 9-277842 disclose drive systems having a belt driven continuously variable transmission combined with a longitudinally mounted engine.

SUMMARY OF THE INVENTION

It is an object of the present invention to provide a small size, particularly short length drive system for transmitting power of a longitudinally mounted engine to driving wheels through a belt drive continuously variable transmission.

The drive system comprises an input shaft extending in a longitudinal direction of a vehicle and connecting a starting device with a forward and reverse changeover apparatus, a primary shaft for mounting a primary pulley arranged in parallel with the input shaft on one lateral side of the input shaft, a secondary shaft for mounting a secondary pulley arranged in parallel with the input shaft on the other lateral side of the input shaft and a hollow drive shaft rotatably fitted over the input shaft for transmitting output of the forward and reverse changeover apparatus to the primary shaft. Further, the input shaft penetrates a space surrounded by a drive belt looped over the primary and secondary pulleys.

DESCRIPTION OF PREFERRED EMBODIMENTS

Figure 1:
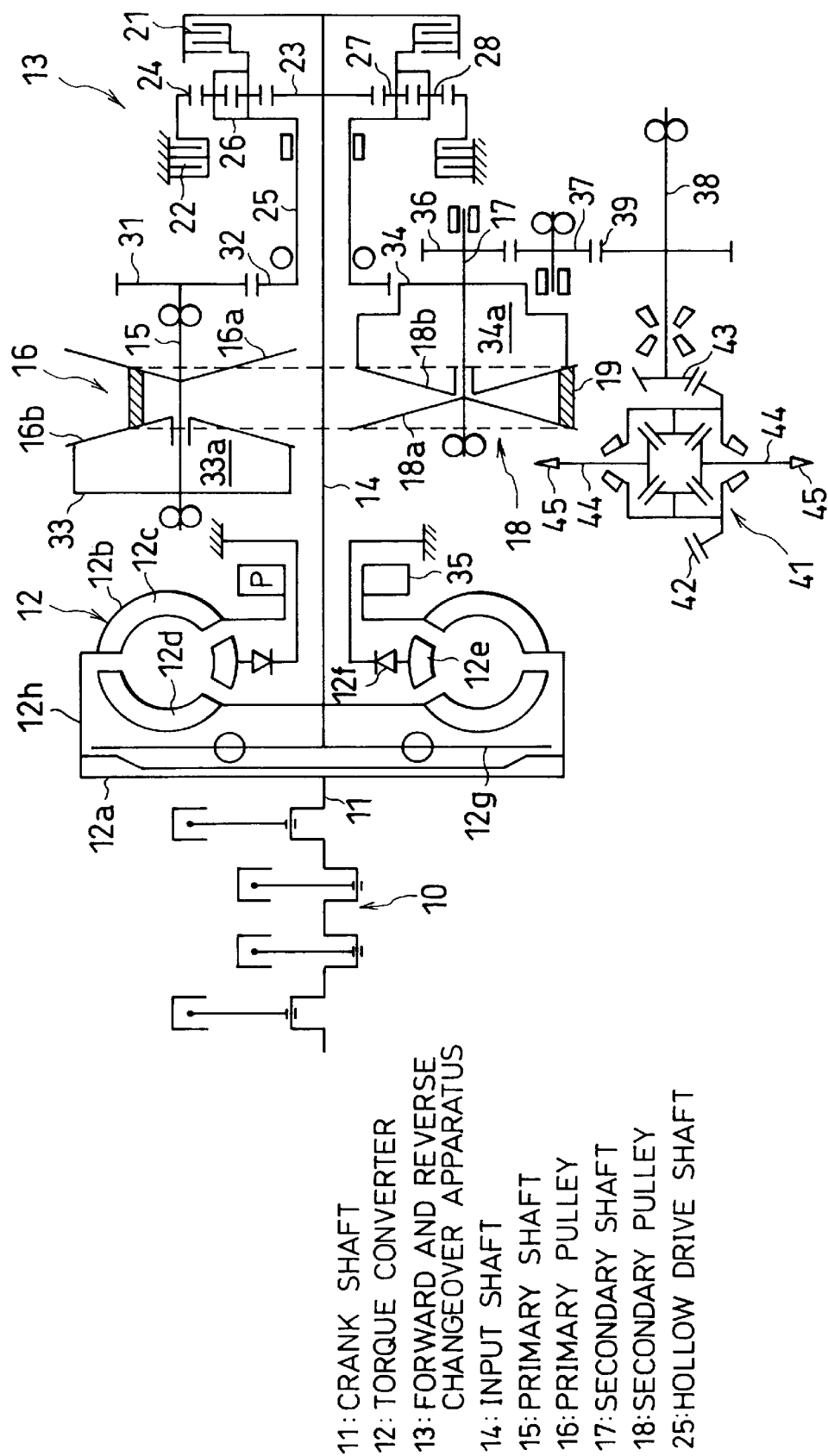
FIG 1. is a schematic skeleton view showing a drive system for a vehicle according to an embodiment of the present invention.
Figure 2:
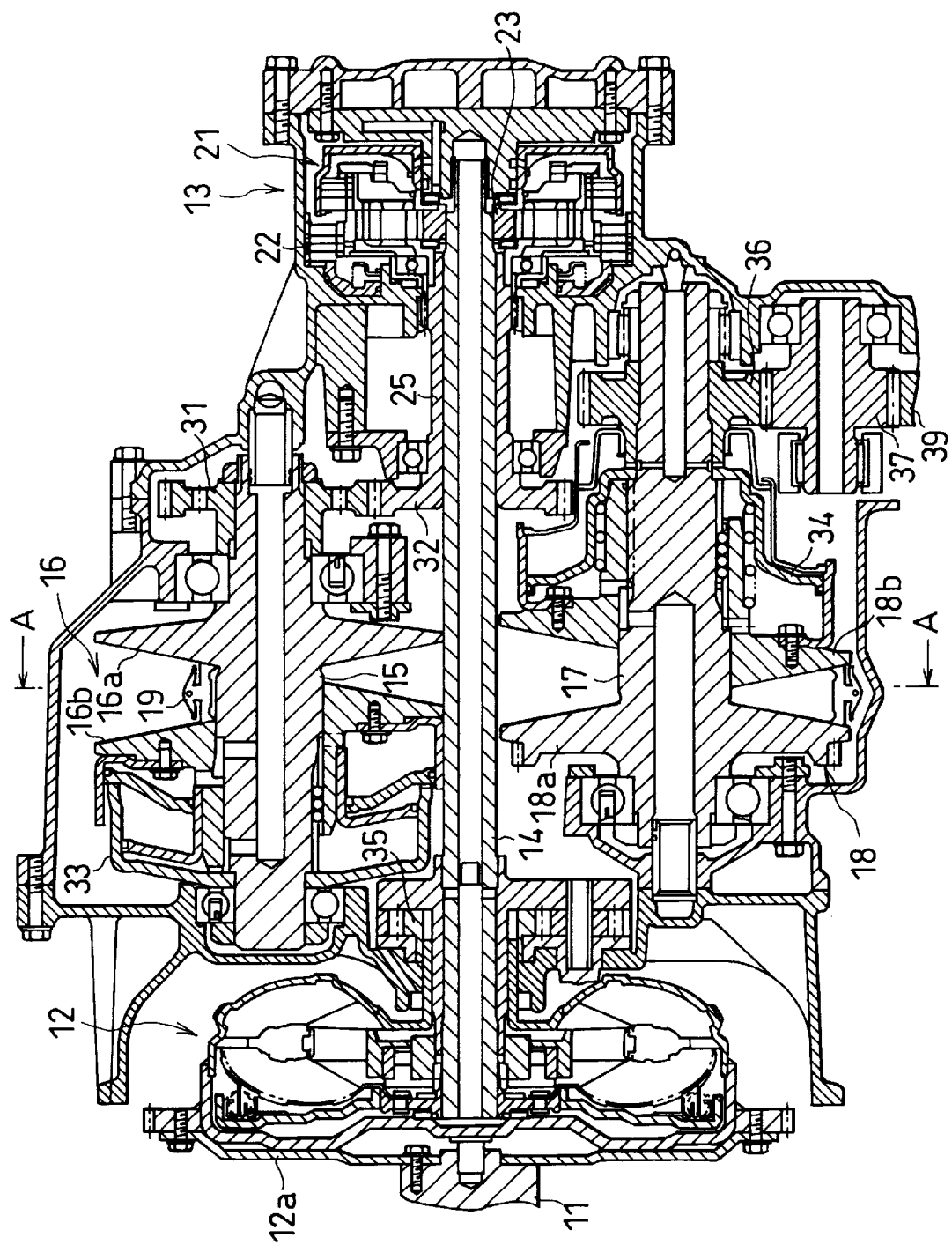
FIG. 2 is a sectional view showing a construction of a drive system for a vehicle according to an embodiment of the present invention.

Referring now to FIG. 1, an engine 10 is mounted on the front side of an engine room in the center of a transverse direction of a vehicle and a crank shaft 11 of the engine 10 is arranged in a longitudinal direction of the vehicle. The crank shaft 11 is connected with a torque converter 12 which acts as a starting device through a drive plate 12a. On the rear side of the engine room, a forward and reverse changeover apparatus 13 is disposed opposite to the torque converter 12. Further, the torque converter 12 is interconnected with the forward and reverse changeover apparatus 13 through an input shaft 14.

The torque converter 12 includes a pump impeller 12c provided in a pump case 12b which is connected with the crank shaft 11 through a converter case 12h and a turbine runner 12d disposed opposite to the pump impeller 12c. A stator 12e is disposed between the pump impeller 12c and turbine runner 12d and is supported by an one-way clutch 12f. An output shaft of the torque converter 12 is integral with the input shaft 14. There is provided a lock-up clutch 12g to engage or disengage with a converter case 12h connected to the drive plate 12a. The rotational power of the engine 10 is transmitted to the input shaft 14 through the turbine runner 12d or the lock-up clutch 12g.

A primary shaft 15 is arranged in parallel with the input shaft 14. The primary shaft 15 is rigidly connected with a fixed sheave 16a and a moving sheave 16b is slidably mounted in a face-to-face relationship with the fixed sheave 16a on the primary shaft 15, a primary pulley 16 being formed by the fixed sheave 16a and the moving sheave 16b. Thus a groove width of the primary pulley 16 is varied by sliding the moving sheave 16b in an axial direction of the primary shaft 15.

A secondary shaft 17 is arranged in parallel with the input shaft 14. The secondary shaft 17 is rigidly connected with a fixed sheave 18a and a moving sheave 18b is slidably mounted in a face-to-face relationship with the fixed sheave 18a on the secondary shaft 17, a secondary pulley 18 being formed by the fixed sheave 18a and the moving sheave 18b. Thus, a groove width of the secondary pulley 18 is varied by sliding the moving sheave 18b in an axial direction of the secondary shaft 17.

A steel belt 19 is looped over both pulleys 16, 18 in order to transmit diving force from the primary pulley 16 on a driving side to the secondary pulley 18 on a driven side, thus a belt driven continuously variable transmission being formed.

Figure 5:
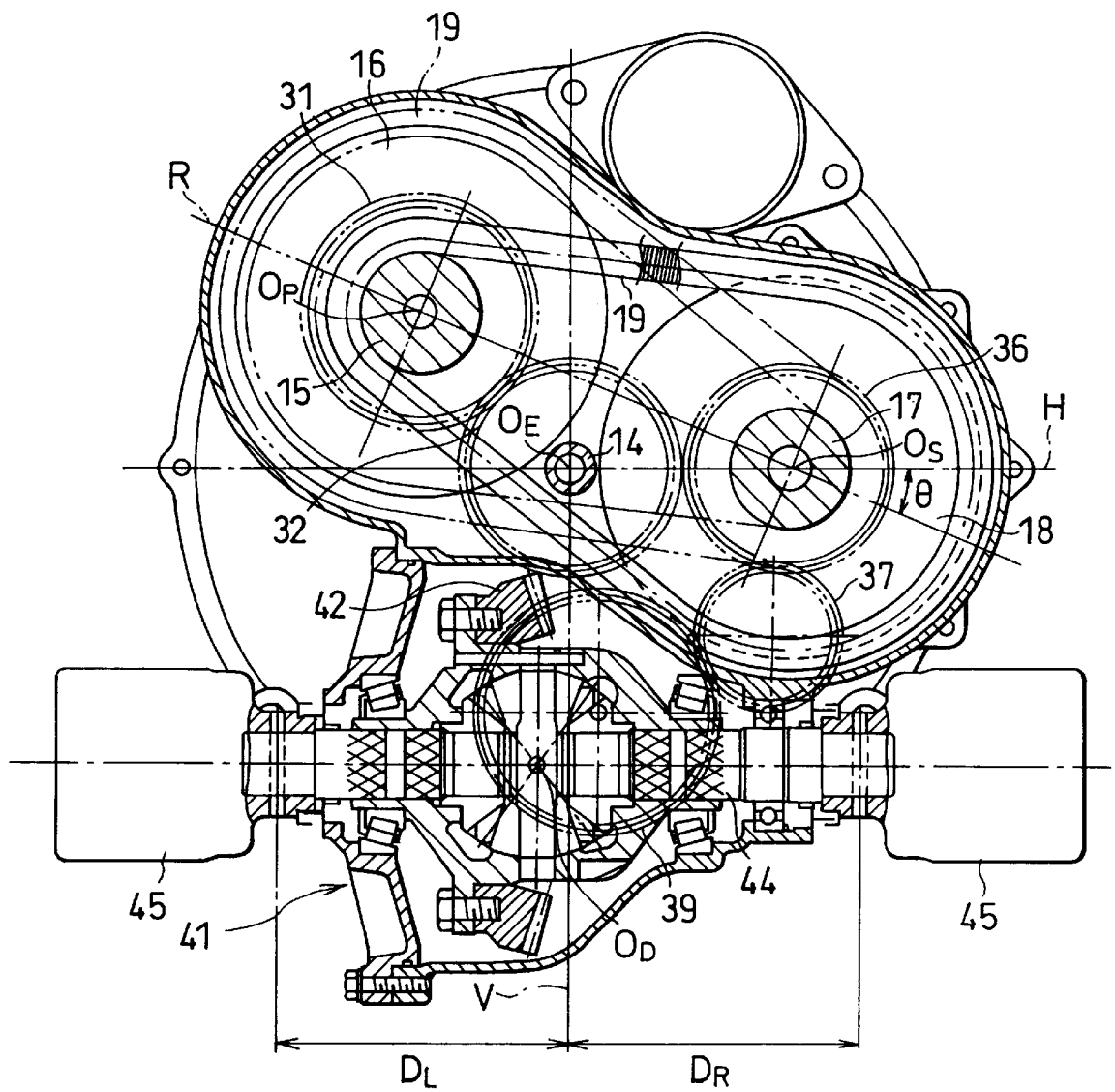
FIG. 5 is a sectional view taken along a line A—A of FIG. 2.

As shown in FIG. 5, a rotation center $O_E$ of the input shaft 14 agrees with a rotation center of the engine 10, namely, a rotation center of the crank shaft 11. Accordingly, the crank shaft 11 is connected with the input shaft 14 on a common axis extended in a longitudinal direction of the vehicle. The primary shaft 15 is arranged at a specified distance away from the input shaft 14 on one widthwise side of the input shaft 14. On the other hand, the secondary shaft 17 is arranged on the other widthwise side of the input shaft 14.

The belt 19 is wound around the primary pulley 16 and the secondary pulley 18 such that it surrounds the input shaft 14. Thus, since two pulleys of heavy weight are disposed in an approximate laterally symmetrical relationship with respect to the input shaft 14, the vehicle can keep a balance in weight.

The input shaft 14, as shown in FIG. 5, penetrates a space surrounded by a loop formed by the belt 19 wound around both pulleys 16, 18. Thus providing the input shaft 14 inside the belt 19 is advantageous in reducing the overall height of the drive system. Further, since such an arrangement can minimize a distance between both centers of pulleys 16, 18, it is possible to reduce the widthwise size of the belt driven continuously variable transmission.

The belt 19 illustrated in a solid line shows a state of minimum winding diameter in the primary pulley 16 and maximum winding diameter in the secondary pulley 18. Further, the belt 19 illustrated in a two-dot chain line shows a state of maximum winding diameter in the primary pulley 16 and minimum winding diameter in the secondary pulley 18. When the belt 19 is displaced between these states, the input shaft 14 is situated at a position where the belt 19 has no contact with the input shaft 14.

A rotation center $O_P$ of the primary shaft 15 is located at a higher position than the rotation center $O_E$ of the input shaft 14 and a rotation center $O_S$ of the secondary shaft 17 is located at a lower position than the primary shaft 15. This arrangement enables to install a differential 41 having a crown gear 42 with large diameter in proximity to the pulleys under both pulley shafts.

The forward and reverse changeover apparatus 13 employs double pinion type planetary gears, comprising a forward clutch 21 connected to the input shaft 14 and a reverse brake 22 attached to a transmission housing. A sun gear 23 is secured to the input shaft 14 and pinions 27, 28 is provided around the sun gear 23. Further, a ring gear is provided around the pinions 27, 28. The reverse brake 22 is for fixing the ring gear 24 or allowing the rotation of the ring gear 24 by means of friction plates provided in the reverse brake 22.

A hollow drive shaft 25 is rotatably fitted over the input shaft 14. A carrier 26 is secured to the hollow drive shaft 25. The carrier 26 rotatably supports the pinion 27 which meshes with the sun gear 23 and the pinion 28 which meshes with the pinion 27 and the ring gear 24. On the other hand, the carrier 26 is connected with the forward clutch 21 having a friction plate. The engagement or disengagement of the forward clutch 21 and the reverse brake 22 is performed by hydraulic pistons (not shown).

In order to transmit the output of the forward and reverse changeover apparatus 13 to the primary shaft 15, there is provided a gear 32 meshing with a gear 31 secured to the primary shaft 15 on the hollow drive shaft 25. As shown in FIG. 5, it should be noted that since the input shaft 14 is arranged inside of the loop formed by the belt 19, the outer diameter of the gears 31, 32 can be designed to be small, respectively.

When the reverse brake 22 is OFF, that is, the ring gear 24 is in a rotatable state, and when the forward clutch 21 is ON, that is, the carrier 26 is engaged with the input shaft 14, the power of the engine 10 transmitted to the input shaft 14 through the torque converter 12 is transferred in a forward rotation to the primary shaft 15 through the gears 32, 31. On the other hand, when the reverse brake 22 is ON, that is, the ring gear 24 is in a fixed state, and when the forward clutch 21 is OFF, that is, the carrier 26 is disengaged from the input shaft 14, the engine power of the input shaft 14 is transferred in a reverse rotation to the primary shaft 15 through the planetary gears.

A cylinder 33 is provided around the primary shaft 15 to vary the groove width of the primary pulley 16. The cylinder 33 forms an oil chamber 33a together with the moving sheave 16b. Similarly, a cylinder 34 is provided around the secondary shaft 17 to vary the groove width of the secondary pulley 18. The cylinder 34 forms an oil chamber 34a together with the moving sheave 18b. An oil pump 35 is driven by the crank shaft 11 through a pump case 12b to generate hydraulic pressure. The hydraulic pressure is fed to the respective oil chambers 33a, 34a after being regulated and operates the moving sheaves 16b, 18b respectively.

Generally, the diameter of the cylinder on the primary pulley side is larger than that of the cylinder on the secondary pulley side. Further, the longitudinal or axial length of the moving sheave on the primary side is shorter than that of the moving sheave on the secondary side. In this embodiment, the cylinder 33 of the primary pulley 16 is disposed on the side of the torque converter 12 and therefore the moving sheave 16b of the primary pulley 16 is also on the side of the torque converter 12. Accordingly, the primary pulley assembly including the cylinder 33 and moving sheave 16b can near the torque converter 12 side and as a result, the overall length of the transmission can be reduced.

Figure 3:
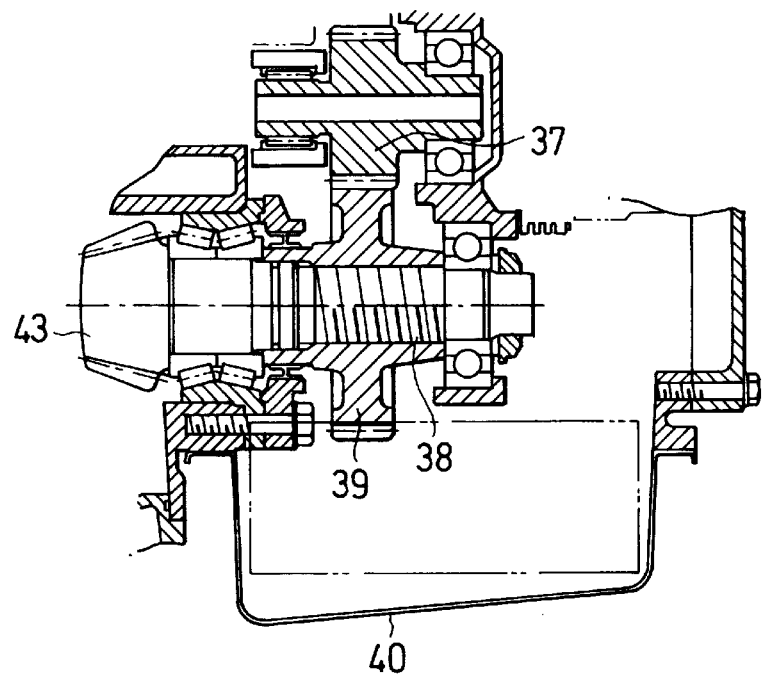
FIG. 3 is a partly sectional view showing a portion of a drive shaft and oil pan.

As shown in FIG. 5, a reduction gear 36 is secured to the secondary shaft 17 and an intermediate gear 37 meshing with the gear 36 is provided under the gear 36. As illustrated in FIG. 3, a drive shaft 38 is rotatably disposed in parallel with the input shaft 14 and a drive pinion 39 secured to the drive shaft 38 is in meshed engagement with the intermediate gear 37.

In FIG. 3, an oil pan 40 is provided under a housing of the drive system and a part of the drive pinion 39 dips in lubrication oil in the oil pan 40. Thus, lubrication oil is supplied to the reduction gear 36 in company with the rotation of the drive pinion 39.

Figure 4:
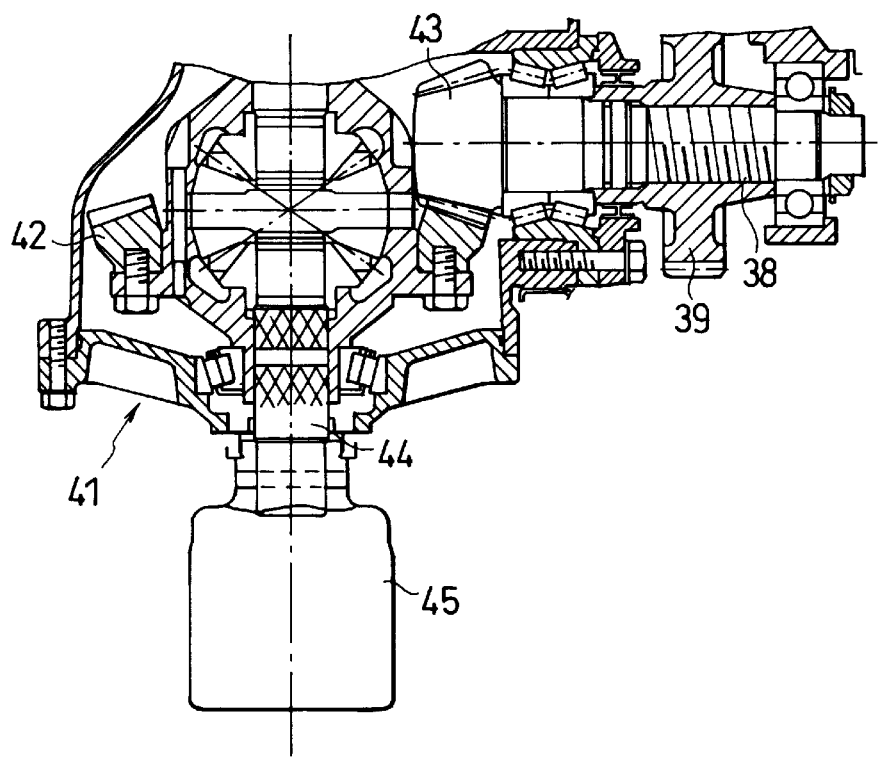
FIG. 4 is a partly sectional view showing a portion of a differential.

As shown in FIGS. 4 and 5, there is provided a final reduction gear unit, a front differential 41 under the primary and secondary pulleys 16, 18. A crown gear 42 of the differential 41 is in meshed engagement with a hypoid gear 43 provided on the rear end of the drive shaft 38.

Summarizing the layout of the drive system according to the embodiment of the present invention, the torque converter 12 and the forward and reverse changeover apparatus 13 are arranged in a face-to-face relationship with each other and the pulley and belt assembly is disposed between the torque converter 12 and the forward and reverse changeover apparatus 13. Furthermore, the input shaft 14 connecting the torque converter 12 and the forward and reverse changeover apparatus 13 penetrates the pulley and belt assembly. Further, the differential 41 is disposed in a space under the pulley and belt assembly. This layout provides the drive system for a longitudinally mounted engine with a compactness, particularly a short longitudinal size and a symmetrical arrangement.

As a result, in a continuous variable transmission having disadvantage in an extended longitudinal length when applied to a longitudinally mounted engine, it is possible to mount the dive system on a vehicle without interfering with the toe board. Further, it is possible to install the drive system according to the present invention in an engine room of a conventional vehicle without making major modifications.

Further, since the pulley and belt assembly is disposed above the differential 41, the belt 19 or pulleys 16, 18 can be prevented from agitating lubrication oil in the oil pan and as a result agitation loss of lubrication oil can be reduced and an increase of oil temperature can be prevented.

Further, since the secondary pulley 18 of the driven side is disposed at a lower position than the primary pulley 16, the distance between the rotation center of the secondary pulley 18 and the drive shaft 38 can be reduced, as a result the outer diameter of the reduction gear 36, the intermediate gear 37 and the drive pinion 39 can be decreased.

The differential 41 has an output shaft 44 extending in the widthwise direction of the vehicle. The output shaft 44 is connected at left and right ends thereof with left and right front wheels through left and right constant velocity universal joints 45, 45, respectively. The center $O_D$ of the differential 41 is disposed in vicinity of a vertical line V passing through the rotation center $O_E$ of the input shaft 14 or crank shaft 11 and the distances $D_R$, $D_L$ from the vertical line V to the left and right constant velocity universal joints are designed to be identical. If the rotation center $O_E$ of the input shaft 14 is rendered identical to the widthwise center of the vehicle, the length of the left and right drive axles extending from the constant velocity universal joints can be equalized to each other. This is important to keep balance of driving force between left and right wheels.

In this embodiment, the torque converter 12 is employed as a starting device of the continuously variable transmission, however other means such as an electromagnetic clutch may be replaced with the torque converter 12. Further, the drive system according to the present invention has been described based on an example of front wheel-drive vehicles, however the drive system may be also applied to four wheel-drive vehicles.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A drive system of a vehicle having an engine mounted in a longitudinal direction of said vehicle, a starting device connected to said engine, a continuously variable transmission including a primary pulley, a secondary pulley and a drive belt looped over said primary pulley and said secondary pulley and a forward and reverse changeover apparatus, comprising:

an input shaft extending in a longitudinal direction of said vehicle and connecting said starting device with said forward and reverse changeover apparatus;

a primary shaft of said primary pulley arranged in parallel with said input shaft on one lateral side of said input shaft;

a secondary shaft of said secondary pulley arranged in parallel with said input shaft on the other lateral side of said input shaft; and a hollow drive shaft rotatably fitted over said input shaft for transmitting an output of said forward and reverse changeover apparatus to said primary shaft.

2. The drive system according to claim 1, wherein said continuously variable transmission is disposed between said starting device and said forward and reverse changeover apparatus.

3. The drive system according to claim 1, wherein said input shaft penetrates a space surrounded by said drive belt looped over said primary and secondary pulleys.

4. The drive system according to claim 1, further comprising:

a differential provided under said primary and secondary pulleys and having an output shaft extending in an orthogonal direction of said input shaft; and a drive pinion driven by said secondary shaft and provided in parallel with said input shaft for driving said differential.

5. The drive system according to claim 1, wherein said primary shaft is located in a higher position than said secondary shaft is.

6. The drive system according to claim 1, wherein said primary pulley comprises a moving sheave and a fixed sheave and said moving sheave is disposed on a side of said starting device.

7. The drive system according to claim 1, wherein said input shaft has a center axis substantially agreeing with a center line of said vehicle, when viewed from the top of said vehicle.

8. The drive system according to claim 4, wherein said drive pinion has a center axis substantially agreeing with a center line of said vehicle, when viewed from the top of said vehicle.

* * * * *